United States Patent [19]

Johnson et al.

[11] Patent Number: 4,734,229

[45] Date of Patent: Mar. 29, 1988

[54] METHOD FOR CALENDERING TEMPERATURE-CRITICAL THERMOPLASTIC MATERIAL USING A TWO-PHASE HEAT TRANSFER MEDIUM

[75] Inventors: Peter E. Johnson; James Young, both of Corvallis, Oreg.

[73] Assignee: Entek Manufacturing Inc., Lebanon, Oreg.

[21] Appl. No.: 861,047

[22] Filed: May 8, 1986

Related U.S. Application Data

[63] Continuation-in-part of Ser. No. 670,267, Nov. 13, 1984, abandoned.

[51] Int. Cl.⁴ .................... B29C 43/24; B29C 43/46; B29C 43/58
[52] U.S. Cl. .................... 264/40.6; 100/93 RP; 165/2; 165/89; 264/40.1; 264/175; 264/280; 425/143; 425/363; 425/384
[58] Field of Search ............ 264/40.1, 40.6, 175, 264/280, 345, 346; 100/93 RP; 425/143, 363, 384; 165/2, 89

[56] References Cited

U.S. PATENT DOCUMENTS 2,575,590  11/1951  Goulding, Jr. ............ 425/363 X
2,933,760  4/1960  Von Der Heide ......... 264/175 X
3,451,331  6/1969  Fredrickson et al. ...... 100/93 RP Primary Examiner—Jeffery Thurlow
Assistant Examiner—Leo B. Tentoni
Attorney, Agent, or Firm—Chernoff, Vilhauer, McClung & Stenzel

[57] ABSTRACT

The calender rolls of the present invention are comprised of relatively thin-walled hollow shells which are supported at each end by shafts having bores which extend into the cavities formed in the rolls. Fittings located at the ends of the shafts are rotatable relative to them so that by tying the fittings together they do not rotate along with the rolls. The fittings at one of the ends of the rolls are connected to a source of wet steam through a pressure regulator and the fittings at the other ends carry probes which extend through the shafts and curve downwardly towards the bottoms of the rolls. A valve regulates the amount of material which flows out of the cavities through the probes. The method by which the rolls are used comprises introducing wet steam into the cavities, maintaining its pressure at a constant level. Since the temperature of wet steam depends upon its pressure, by controlling the pressure of the steam in the cavities and maintaining it at a constant pressure the outer surfaces of the rolls can be maintained at a constant desired temperature, irrespective of the effect of the temperature of the material being calendered or of ambient temperature.

3 Claims, 4 Drawing Figures

METHOD FOR CALENDERING TEMPERATURE-CRITICAL THERMOPLASTIC MATERIAL USING A TWO-PHASE HEAT TRANSFER MEDIUM

RELATED APPLICATIONS

This application is a continuation-in-part of application Ser. Number 06/670,267 filed Nov. 13, 1984, now abandoned.

BACKGROUND OF THE INVENTION

This invention relates to a method for controlling the characteristics of a sheet which is calendered from a temperature-critical thermoplastic material.

The method which generally is used to form thin sheets from thermoplastic material is to heat the material until it reaches a plastic state, force it through an extrustion die to form a homogeneous sheet, and then calender it to achieve the desired thickness and to impart any required contouring or special surface finish to it. Not only is calendering necessary where the thickness of the sheet is critical or where a special surface finish is required, if the resulting sheet is to be very thin, this sequence is much faster than extruding directly to the final thickness. Moreover, extruding directly to a very thin gauge generally will not provide a uniform product. Thus, calendering normally is the final step in producing thin sheets of thermoplastic material.

Since thermoplastic material must remain in a plastic state when it is being calendered, provisions must be made to maintain the calender rolls at the desired temperature. While this does not present any difficulty with many materials, some materials, such as ultrahigh molecular weight polyethylene compositions, can only be calendered if they are maintained within extremely narrow limits of temperature. If the surface temperature of the calender rolls should exceed these limits the material will stick to them, and if the surface temperature drops below these limits the resulting sheet will be brittle. Due to the narrow temperature range where such material can be calendered it is necessary that the rolls be heated at times and cooled at other times, and it may even be necessary to simultaneously cool portions of the rolls while other portions are being heated.

In the past, attempts have been made to maintain the temperature of the rolls within these close limits by convective heat transfer from heated and/or cooled oil or water which flows through them. If this fluid is allowed to flow unrestricted through the rolls at a low velocity there will be poor heat transfer and thus tremendous flow rates are necessary to transfer sufficient energy to give the quick response necessary to maintain the temperature within the required limits. Therefore, flow restrictors have been utilized to increase the rate of heat transfer and to provide surface temperature uniformity, making the rolls difficult and expensive to fabricate.

In addition, convective heat transfer requires a temperature differential between the fluid and the wall it is transferring energy to, and the greater the rate of heat transfer required the greater this temperature differential must be. Therefore, if the wall is being heated the fluid probably will initially be brought to a temperature which is greater than the temperature that the wall is to be heated to and then gradually cooled as the wall temperature approaches the desired temperature. Not only does this result in slow reaction to changes, if the wall temperature is not uniform and heating is generally required, there will be occasions where heat will be transferred to local hot spots which already are over temperature. These hot spots would not be cooled then until the system reached a point where very little overall heating or even cooling was required. Furthermore, with convective heat transfer the fluid either looses or gains in temperature as it flows through the rolls depending on whether it is heating or cooling. Thus, by its very nature convective heat transfer of the type used in the prior art devices results in a temperature gradient being created along the rolls. Finally, due to the difficulty in maintaining oil or water at a constant temperature, these devices require complex feed-back systems.

For the foregoing reasons, the prior art processes are slow in reacting to changing demands between heating and cooling, do not provide uniform surface temperature, and cannot cool local areas of the rolls while the rolls are in general being heated.

What is needed therefore is a calender roll which is simple and inexpensive to manufacture and yet which allows control of its surface temperature within a narrow range uniformly over its entire extent.

SUMMARY OF THE INVENTION

The present invention overcomes the foregoing difficulties and disadvantages of prior art calender rolls by providing a hollow cylindrical shell which is enclosed at each end by plates. The shell has the minimum thickness which will withstand the high pressure under which a calender roll operates, and thus the cavity which is formed inside of the roll is relatively close to the roll's outer surface.

Shafts, which extend outwardly from the plates at each end of the roll, have bores passing through them into the cavity. Two of the rolls are mounted in a frame through bearing blocks which journal the shafts so that the rolls are separated from one another by a distance which will cause the sheet being calendered to have the correct thickness. The rolls are rotated in opposite directions by an electric motor through a chain and sprocket drive system.

Rotatably mounted on the ends of the shafts are fittings which are tied together to prevent them from rotating with the rolls. The fittings on one of the ends of the rolls are connected to a source of wet steam through a regulator which controls the pressure of the steam in the cavities. The fittings on the other ends of the rolls carry probes which extend into the cavities. The probes are connected to a valve which regulates the flow rate of steam and/or condensate from the cavities.

Unlike the liquid used as the heat transfer medium in the prior art devices, wet steam is a two-phase mixture of liquid and vapor and the heat transfer in the subject invention is a result of steam which is contacting the walls of the rolls undergoing phase change. Thus more energy can quickly be transferred and the response between heating and cooling is much faster since the fluid will be at approximately the same temperature as the walls. This is because the temperature of wet steam is a direct function of its pressure. If the pressure is kept constant and energy is transferred to the steam its temperature does not raise but it merely becomes dryer with the energy going into the vaporization of some of the liquid into vapor. Likewise, if energy is transferred out of steam kept at a constant pressure its temperature does not drop but it merely becomes wetter, with the energy being created by the condensation of some of the vapor into liquid.

What this means in the subject invention is that, as the wall temperature drops below the desired level, steam will become condensed on the wall and the condensate will transfer heat to it. If the wall temperature becomes too high, on the other hand, water suspended in the steam will boil on the wall thus cooling it back down. Since the temperature of the outer surfaces of the rolls directly follows the temperature of the cavity walls, if the former remains constant so will the latter. As a result the outer surface temperature of the rolls can be controlled by controlling the pressure of the steam in the cavities.

Accordingly, it is a principal object of the present invention to provide a calender roll having a cavity which permits rapid energy transfer from the wall of the cavity to the outer surface of the roll.

It is a further object of the present invention to provide such a roll which is adapted for receiving steam into its cavity.

It is a further object of the present invention to provide a method for controlling the temperature of said roll by controlling the pressure of steam which is introduced into the cavity.

The foregoing and other objects and advantages of the present invention will be more readily understood upon consideration of the detailed description of the invention taken in conjunction with the accompanying drawings.

DETAILED DESCRIPTION OF A PREFERRED EMBODIMENT

Figure 1:
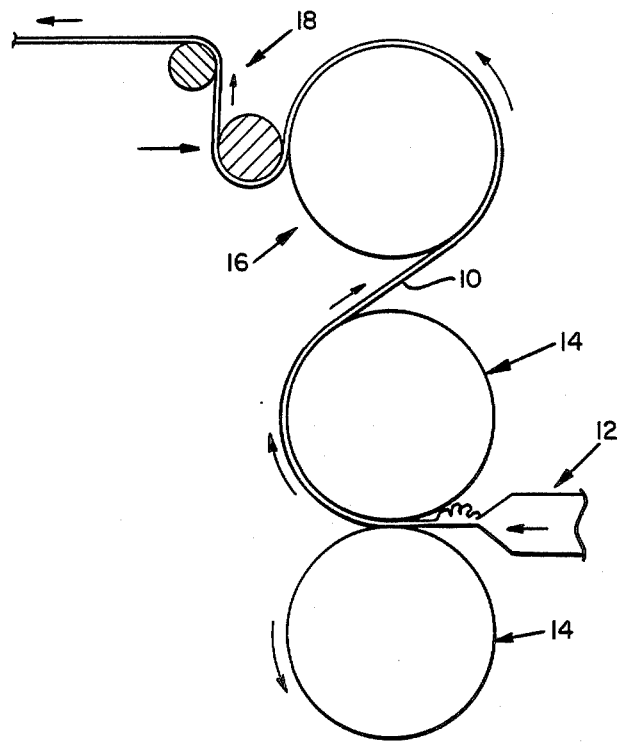
FIG. 1 is a diagrammatic view of a typical calender.

Referring to FIG. 1 of the drawings, normally a sheet of thermoplastic material is calendered after extrusion in order to obtain close control of the thickness of the sheet, to form it in a desired lateral contour, or to impart a pattern or other surface finish to it. This typically is accomplished by passing the sheet 10 immediately after it leaves the extrusion die 12 through a calender comprising a pair of calender rolls 14 which are separated from each other by the proper distance to impart the desired thickness to the sheet. The calendered sheet is passed over a cooling roll 16 where it is hardened and then it is directed through additional stations 18 for trimming, dividing laterally and feeding onto storage rolls.

Figure 4:
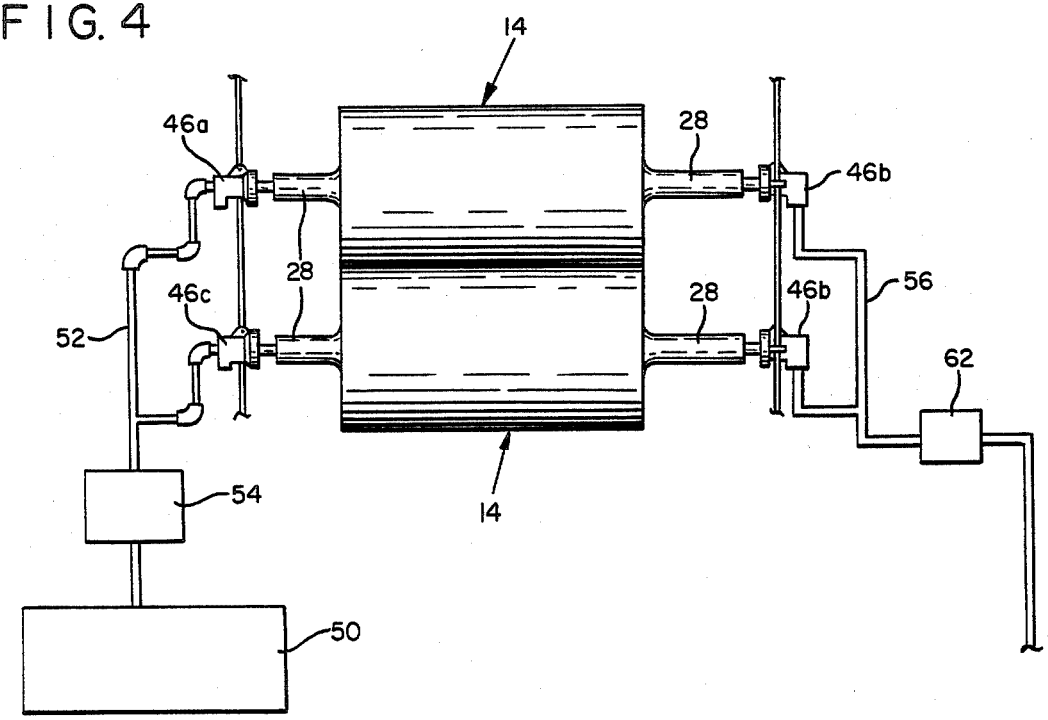
FIG. 4 is a schematic view of a calender embodying features of the present invention.
Figure 2:
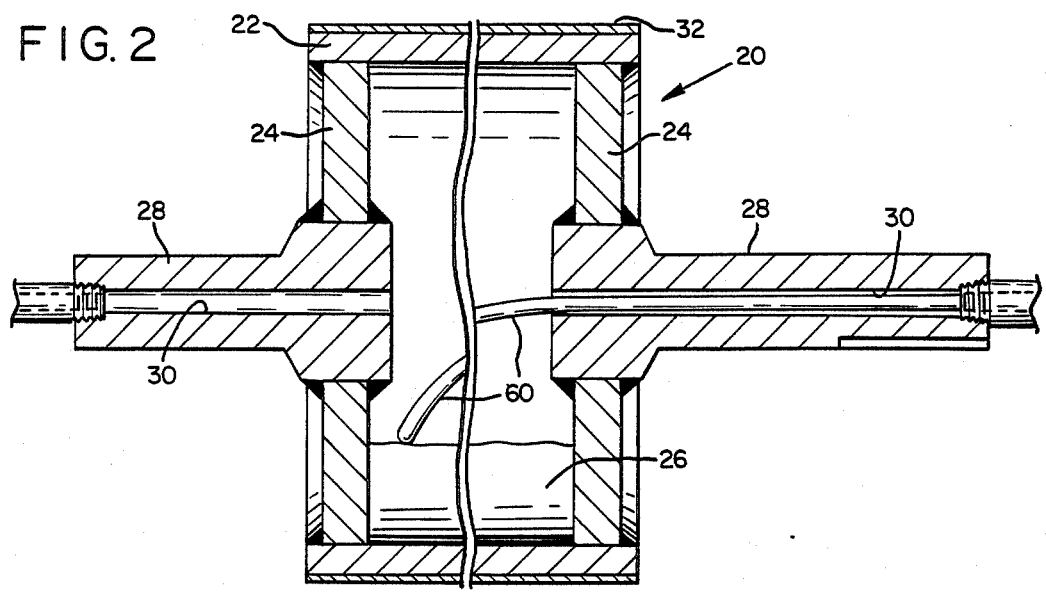
FIG. 2 is a foreshortened, cross-sectional view of a calender roll embodying features of the present invention.
Figure 3:
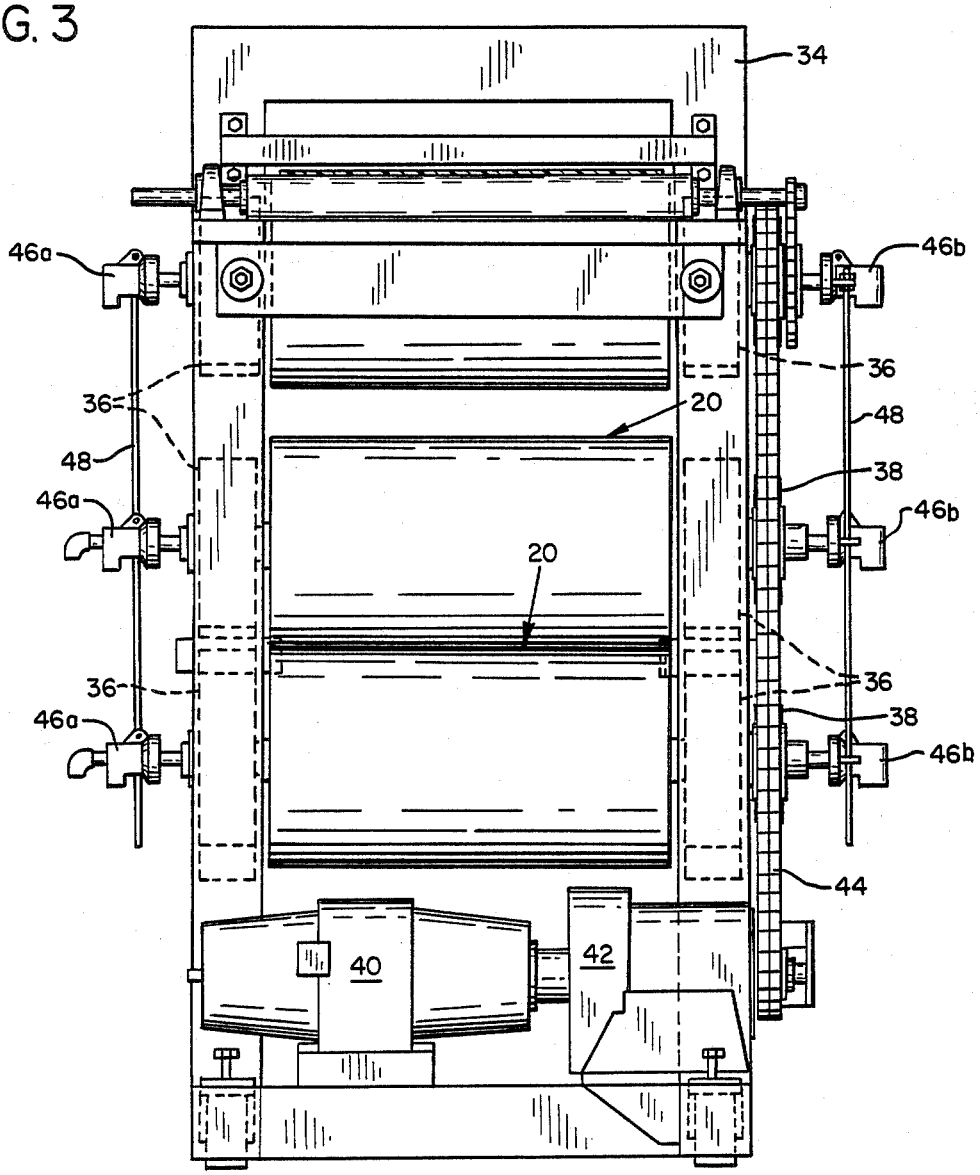
FIG. 3 is a side elevational view showing two of the rolls of FIG. 2 installed in a calender.

Since the material must remain in a plastic calenderable state during the calendering process, provisions must be made for maintaining the calender rolls at the proper temperature. The present invention, shown in FIGS. 2-4, provides a method for maintaining the temperature of the calender rolls within narrow limits for calendering material which is calenderable only over a limited temperature range. For example, electric storage battery plates often are encapsulated in a microporous polyethylene material which is formed from an ultrahigh molecular weight polyethylene composition which contains a significant amount of filler material, such as silica, calcium carbonate, or carbon black, and a significant amount of processing oil which is dispersed through the material in discernable pockets and veins. These compounds are calenderable only within extremely narrow temperature limits which have heretofore only been obtainable with highly complex and expensive equipment.

The calender rolls 20 of the present invention comprise cylindrical shells 22 which are enclosed at each end by plates 24 thereby forming hollow cavities 26 in their centers. The shells 22 have a wall thickness which is great enough to withstand the high pressure (500 pounds per linear inch) under which calender rolls operate without bending, and yet are thin enough to allow rapid energy transfer through them. For a 34-inch long and 18-inch diameter roll, a 1-inch wall thickness serves this purpose. Attached centrally to each of the plates 24 is a shaft 28 which is co-axially aligned with the rolls and which has bores 30 extending through it into the cavities. The outer surfaces 32 of the rolls are plated in a manner to form a smooth finish and any desired contouring or pattern in the sheet material being processed. The rolls are mounted for rotation in an upright frame 34 having paired spaced apart bearing blocks 36 with bearings located therein which journal the shafts 28. Attached to one end of each of the rolls is a sprocket 38 which is driven by an electric motor 40 and gear reduction unit 42 through a chain 44. The aforementioned apparatus for rotatably mounting and driving the rolls is well known in the industry and thus is not described here in any further detail.

Rotatably attached to the ends of the shafts are fittings 46 which are tied together by rods 48 and thus remain irrotatable as the rolls 20 are rotated. The fittings 46a located on one of the ends of the rolls are connected to a source of wet steam 50 through a supply line 52. A commercially available variably adjustable pressure regulation valve 54 is located in the supply line near the fittings 46a.

The fittings 46b which are located on the other ends of the rolls are connected through a line 56 which allows steam and condensate to continuously flow out of the cavities 26. A variable orifice valve 62 located in the line 56 regulates the flow rate of steam and condensate through the line. Extending into the cavities from the fittings 46b are elongate probes 60 which curve downwardly such that their tips are located approximately one-third of the way up from the bottom walls of the cavities. Since the fittings 46b do not rotate with the rolls, the tips of the probes 60 remain at the same level in the cavities at all times where any condensate which accumulates in the cavities above the level of the probes will be removed from the cavities. Thus, condensate will fill the bottom one-third of the cavities.

In use, wet steam is introduced into the cavities 26 through the line 52. Normally the rolls 20 of the present invention are cool enough initially to create enough condensate to fill the cavities up to the probes 60. If not, water must be introduced into the cavities.

Since wet steam is a two-phase fluid containing both vapor and liquid, its temperature is a direct function of its pressure. Thus, the temperature of the outside surface of the rolls can be controlled very closely by controlling the pressure of the steam in the cavities through the valve 54. If the temperature of the walls of the cavities should drop below the steam temperature, condensate will be formed on the walls and transfer heat to them, thereby heating them back to the steam temperature. On the other hand, if the temperature of the walls should rise above the steam temperature, they will cause water in the wet steam to boil thereby cooling the walls back to the condensate temperature.

The fact that the probe 60 is located above the bottom of the rolls 20 and that it is continuously allowing steam and/or condensate to flow out of the cavities 26 permits the above-described process to occur at all times. If there was not continuous flow and heating was required for an extended period the steam would soon completely condense and then no further heating would be possible. It is only constantly removing material through the line 56 that permits new steam to enter the cavities and continue the heating.

Likewise, if cooling was required for an extended period the steam might be too dry to provide the necessary liquid for cooling even though there is a continuous flow of steam through the cavities. However, the fact that the cavities are one-third full of liquid insures that there will be a sufficient supply of liquid for cooling at all times.

Because the temperature drop across the walls remains constant, unless there is a change in ambient conditions, if the temperature of the cavity wall remains constant the surface temperature of the roller will remain constant also. If ambient conditions change to where the temperature drop across the walls changes, then it will be necessary to adjust the steam pressure to keep the outer surfaces at the rolls at the desired temperature. While the end plates do effect heat transfer characteristics of the walls somewhat there is very little temperature gradient along the rolls and even this can be minimized by careful design.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method for calendering temperature-critical plastic material comprising:
    (a) directing the material through a pair of driven rolls having outer surfaces which are separated from one another;
    (b) introducing wet steam into cavities located in said rolls;
    (c) maintaining the pressure of said steam at a constant level where said steam remains in a saturated state;
    (d) continuously removing from said cavities steam and any condensate which accumulates therein above a certain level which is above the bottoms of said cavities; and
    (e) wherein said cavities are arranged to permit rapid energy transfer between said steam and the outer surace of said rolls to maintain the outer surface of the rolls at a desired temperature.

2. A method for calendering a thin sheet of temperature-critical plastic material comprising:
    (a) directing the material through a pair of driven rolls having outer surfaces which are separated from one another;
    (b) introducing wet steam into cavities located in said rolls and maintaining said steam in a saturated state;
    (c) adjusting the pressure of said steam to a level where the material does not stick to said rolls and exits from them having a uniform gauge; and
    (d) maintaining the pressure of said steam at said level to maintain the outer surfaces of the rolls at a desired temperature.

3. A method for simultaneously heating and cooling portions of a calender roll to maintain its surface temperature within precise limits, comprising transferring heat to and from said roll as a consequence of phase changes in a constant pressure, saturated, two-phase heat transfer fluid located in a cavity defined in said roll.

* * * * *

UNITED STATES PATENT AND TRADEMARK OFFICE
CERTIFICATE OF CORRECTION

PATENT NO. : 4,734,229

DATED : March 29, 1988

INVENTOR(S) : Peter E. Johnson, et al.

It is certified that error appears in the above-identified patent and that said Letters Patent is hereby corrected as shown below:

Col. 1, line 19    Change "extrust on" to --extrusion--

Col. 6, line 20    Change "surace" to --surfaces--

Signed and Sealed this

Twelfth Day of September, 1989

Attest:

DONALD J. QUIGG

Attesting Officer

Commissioner of Patents and Trademarks